United States Patent
Osterlund et al.

(10) Patent No.: US 6,942,302 B2
(45) Date of Patent: Sep. 13, 2005

(54) DISTINCTIVE WHEEL COVERS

(75) Inventors: Paul E. Osterlund, Lantana, FL (US); Derek T. Amendola, Lake Worth, FL (US); Dion Amendola, Lake Worth, FL (US)

(73) Assignee: DTA, LLC, Lake Worth, FL (US)

( * ) Notice: Subject to any disclaimer, the term of this patent is extended or adjusted under 35 U.S.C. 154(b) by 0 days.

(21) Appl. No.: 10/403,856

(22) Filed: Mar. 31, 2003

(65) Prior Publication Data

US 2004/0189080 A1 Sep. 30, 2004

(51) Int. Cl.⁷ .................................................. B60B 7/00
(52) U.S. Cl. .......................... 301/37.105; 301/37.35; 301/37.106; 301/37.42; 301/3
(58) Field of Search .................. 301/105.1, 59, 301/37.41, 37 R, 37.105, 37.42, 37.106, 37.109, 104, 37.108, 37.35, 37.36, 58, 37.43, 37.33, 37.104, 64.101

(56) References Cited

U.S. PATENT DOCUMENTS

| | | | | |
|---|---|---|---|---|
| 3,602,550 A | * | 8/1971 | Patane et al. | 301/37.104 |
| 3,987,409 A | * | 10/1976 | Freeman | 340/432 |
| 4,418,962 A | * | 12/1983 | Schaffer | 301/37.42 |
| 4,682,821 A | * | 7/1987 | Strazis | 301/37.42 |
| 4,729,604 A | * | 3/1988 | Dietz | 301/37.104 |
| 5,492,392 A | * | 2/1996 | Chen | 301/37.41 |
| D378,999 S | * | 4/1997 | Thomas | D12/213 |
| 5,903,224 A | * | 5/1999 | Reynolds | 340/815.45 |
| 6,286,908 B1 | * | 9/2001 | Maloney et al. | 301/37.43 |

* cited by examiner

Primary Examiner—Frantz F. Jules
(74) Attorney, Agent, or Firm—McHale & Slavin PA

(57) ABSTRACT

Wheel covers are removably attached to a spoked wheel vehicle to provide, identity, protection, illumination and audible sound for safety and pride of ownership. The wheel covers are shaped as disks placed on opposite sides of a wheel. Fasteners on each disk engage the spokes of the wheel to secure the wheel covers in place.

15 Claims, 3 Drawing Sheets

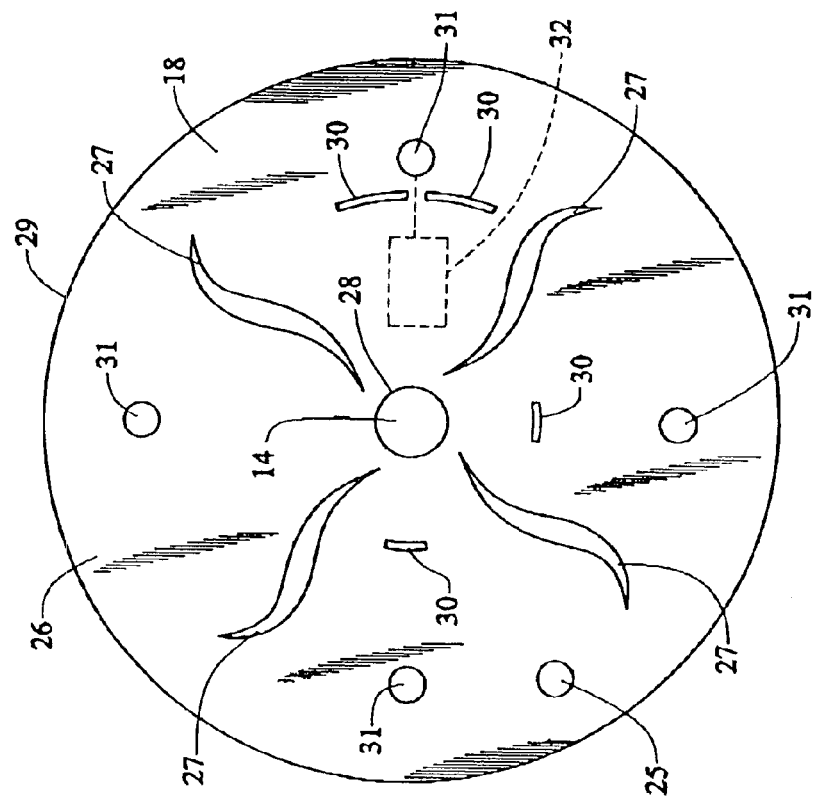
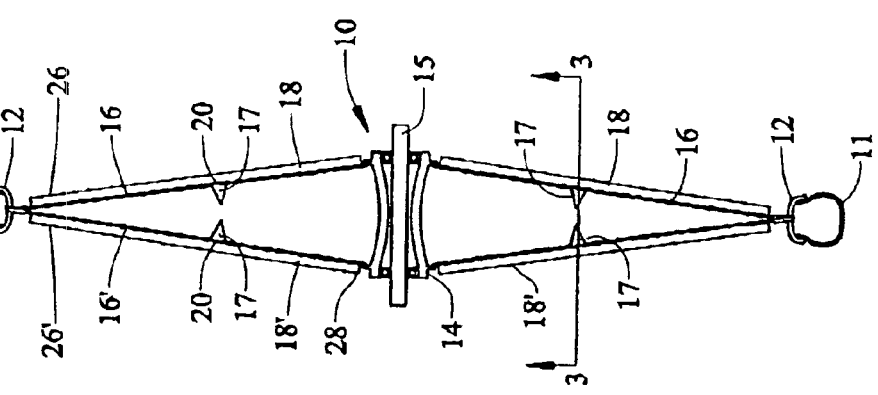

DISTINCTIVE WHEEL COVERS

BACKGROUND OF THE INVENTION

1. Field of the Invention

This invention relates to wheel covers, particularly for wheels that are exposed on both sides. These wheel covers are distinguished from decorative wheels which support the weight of the vehicle.

2. Description of the Prior Art

Decorative hubcaps have been a part of automotive design for a long time. Both original equipment and accessory equipment include choices of many different shapes and materials for wheel covers. In the automotive field, the decorative covers are fitted to the outer side of the wheel so that the design is presented to the external viewer. Since the inner side of the wheel is hidden from view there is no reason for decoration. In larger wheeled vehicles, with drum or disc brakes, the inner side of the wheels require a large volume of air for cooling and inside decorative wheel covers would obstruct the air flow. Usually, the decorative covers are friction fitted onto the wheel rim by flexible tabs capable or maintaining a connection at highway speeds and the various shocks of road conditions. Further, the wheel covers normally do not provide for a central axle aperture but some covers use the wheel lugs for attachment.

Some wheeled vehicles have exposed wheels with both the inner and outer sides of the wheels easily seen by a viewer and the braking system is located or constructed so that air circulation through the wheels is not a necessity. Such vehicles may have multiple wheels ie., four or more, three, two or one and may be powered manually or by motor. In this class of vehicles are motorcycles, bicycles, tricycles, off-road vehicles, mopeds, and others. In the manually powered vehicles, though not limited thereto, the wheels are spoked for reduction of weight.

In racing bikes, the wheels are made of lightweight materials and may be solid to lessen wind resistance. Lightweight wheel covers can serve the same purpose for standard bicycles, with conventional spoked wheels, affording a margin of extra speed for the same physical effort.

U.S. Pat. No. 4,418,962 teaches the use of wheel covers mounted on a bicycle wheel to provide protection for the rider to avoid becoming entangled in the spokes of the wheels. The wheel covers are mounted on both sides of the wheels and snapped together by a series of snap fasteners extending through the spokes. The covers may also increase visibility of the vehicle by having a coating that is reflective, phosphorescent, or decorative.

The decorative hubcaps and wheel covers serve to give the vehicle a distinctive appearance which not only serves to quickly identify the vehicle but provides the owner with pride of ownership and attracts attention.

SUMMARY OF THE PRESENT INVENTION

These smaller vehicles have the disadvantage of size and visibility to both pedestrians and drivers of larger conveyances. They also offer dangers to the riders from exposed moving parts.

Therefore, an objective of this invention is the provision of wheel covers to be mounted on opposite sides of a wheel and fastened together through the wheel for distinctive appearance and safety.

Another objective of the invention is to provide an electrical lighting system for the wheel covers to illuminate the location of the vehicle.

A further objective of the invention is to provide a fastening integrated with the wheel cover.

Yet another objective of the invention is to provide a shock absorbing and compressed fastening to secure the wheel cover in place.

A still further objective of this invention is to provide a wheel cover that generates an audible sound.

SHORT DESCRIPTION OF THE DRAWINGS

FIG. 1 shows a cross section of a wheel with the wheel covers of this invention in place;

FIG. 2 shows a side view of a wheel cover of this invention;

DETAILED DESCRIPTION OF THE INVENTION

Figure 3:
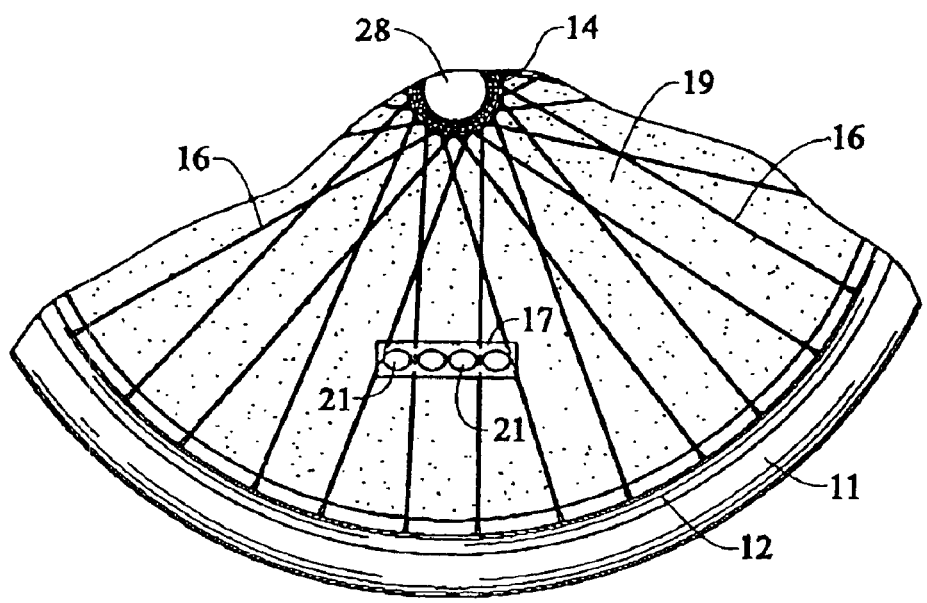
FIG. 3 shows a cross section on line 3—3 of FIG. 1 of a fastener and shock absorber.

A wheel 10 is shown, in FIG. 1, with a tire 11 mounted on a rim 12. The wheel 10 has a hub 14 which rotates about an axle 15. Spokes 16 extend from the hub 14 to the rim 12 to provide rigidity and shape to the wheel 10. Conventionally the spokes 16 diverge from the smaller diameter hub 14 toward the larger diameter rim 12 at a uniform angle. The sloping distance between adjacent spokes provides a wedging effect for attachment of fasteners 17. Also conventionally, some spoked wheels have more than one set of spokes which may cross each other about the circumference of the rim, for example, spokes may extend from one end of a hub to the opposite edge of the rim in an alternating pattern. Such spoke arrangements would provide an even greater number of attachment points. For purposes of illustration only and not limitation, one set of spokes is shown in the drawings.

The wheel covers 18 and 18' have an inner surface 19 that faces the spokes of the wheel and is hidden from the external viewer. The fasteners 17 are attached on one side 20 to the inner surface 19 by suitable connection, such as molding, adhesives, brads, clips, threaded screws, etc. The fasteners 17 have protruberences 21 to engage the spokes of the wheel in such a manner to secure the wheel cover during operation of the vehicle. The protruberences may be somewhat stiff but resilient so that some frictional or linear force is exerted between the protruberences and the spokes. The resilience of the fasteners also acts as a shock absorber when the vehicle is moving over uneven terrain. The resilience of the fasteners also permits removal of each wheel cover without disassembly or destruction of the device or vehicle.

Figure 4:
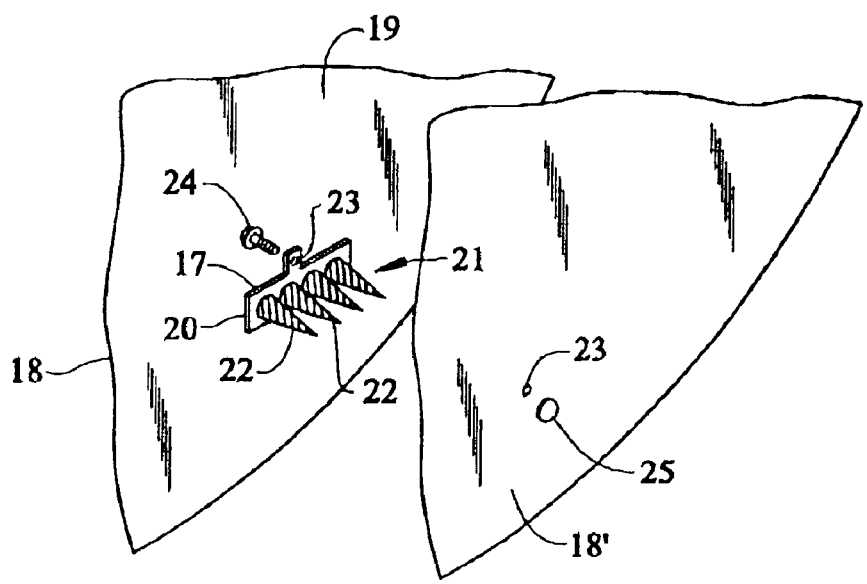
FIG. 4 shows a fastener and shock absorber partially in section.

As shown in FIG. 4, the protruberences may have wedge shaped fingers 22 which will grasp the spokes of a wheel when the wheel cover is pressed upon the wheel. Other shapes are possible including hook shaped fingers that are flexed as the hook portion goes through the spokes and then springs back to grasp the spokes. The fasteners 17 can also have a stronger connection by including a bore 23 through some of the fasteners which can be aligned with bores in other fasteners in the opposite disk so that disks on both sides of the wheel are connected by bolts 24 and nuts 25. The heads of the bolts and the nuts are formed, covered or otherwise altered to form part of the distinctive outer surface of the wheel covers.

The distinctive outer surfaces 26, 26' of the wheel covers 18,18' are to be seen by the external viewer for attracting attention to the location of the vehicle as a safety measure for the rider. To attract the attention of pedestrians and drivers of other conveyances, the distinctive outer surface may have vibrant colors, or shapes that may provide optical illusions, or both. It is also possible to provide the wheel covers with illumination and audible sound generation.

In FIG. 2, a wheel cover 18 is illustrated with several of the features which may be present alone or in any combination on any wheel cover. Radial slots 27 can extend from the area of the central aperture 28 toward the outer periphery 29. These slots 27 may be constructed to produce audible sound during rotation of the wheel. Another structural feature may be the interrupted circumferential slots 30 which may be spaced at different distances from the central aperture 28.

An array of electric lights 31 may be attached to the outer surface and operated by a battery pack 32 mounted on the wheel cover. Of course, these lights may be the same or different colors and may operate continuously or blink in a random or serial fashion.

Figure 5:
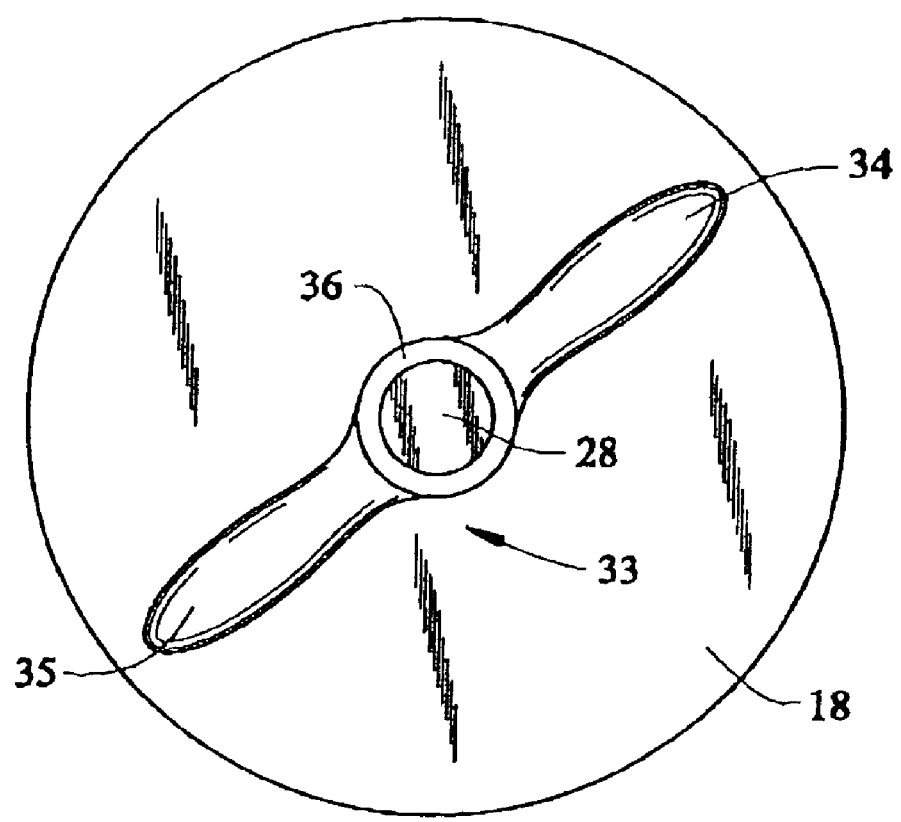
FIG. 5 shows a free wheeling spinner mounted on the wheel cover.

In FIG. 5 the wheel cover 18 has a spinner 33 rotatably mounted in the central aperture 28. The spinner may be in the form of a propeller with a twist in the elongated arms 34 and 35. During movement of the vehicle, the spinner 33 will react to the air flow by the wheel cover to spin independently of the rotation of the wheel cover. Obviously, the spinner will continue to turn after the vehicle has come to a stop. The hub 36 of the spinner may be channel shaped with flanges on the inner and outer surfaces and carry bearings within to engage the central aperture 28. Other conventional rotary connections ma be employed.

To increase the visibility, the distinctive outer surface may be polished medal for a mirror-like finish, or coated with an iridescent paint that appears to changes colors during rotation, or coated with a vibrant primary color or mixture. The wheel covers are thin disks which may be made of any lightweight material, such as plastic, fiberglass, metal, wood or the like. The distinctive outer surface may be applied by lamination, paint, impregnation, or the like.

A number of embodiments of the present invention have been described. Nevertheless, it will be understood that various modifications may be made without departing from the spirit and scope of the invention. Accordingly, it is to be understood that the invention is not to be limited by the specific illustrated embodiment but only by the scope of the appended claims.

We claim:

1. A set of wheel covers for mounting on opposite sides of a spoked wheel comprising a first and a second thin disk, said first and second thin disks having a distinctive outer surface and an inner surface, said first and second thin disks each having a central aperture therethrough adapted for passage of an axle, said first and second thin disks each extending from said central aperture to an outer periphery adapted to be disposed near the rim of the spoked wheel, a plurality of fasteners attached to said inner surface of said first and second thin disks and arranged in a circular pattern about each said first and second thin disks between said central aperture and said outer periphery, said fasteners each having resilient protuberances adapted to elastically deform to engage a plurality of the spokes of the wheel whereby said first and second thin disks may be independently removably attached to opposite sides of the spoked wheel.

2. A set of wheel covers of claim 1 wherein said distinctive outer surface of each of said first and second thin disks is visually distinct, said distinctness resulting from one of the group consisting of a coating of a highly polished metal, iridescent colors, primary colors end mixtures thereof.

3. A set of wheel covers of claim 1 wherein said first and second thin disks are discontinuous, said discontinuities extending radially as a plurality of slots extending from near said central aperture toward said outer periphery.

4. A set of wheel covers of claim 3 wherein an array of electric lights is connected to at least one of said first and second thin disks, each array operatively connected to a battery pack, said battery pack mounted on at least one of said first and second thin disk, said array illuminating said distinctive outer surface of at least one of said first and second thin disk.

5. A set of wheel covers of claim 3 wherein said discontinuities are shaped to generate and audible sound during rotation of a wheel.

6. A set of wheel covers of claim 1 wherein an array of electric lights is connected to at least one of said first and second thin disks, each array operatively connected to a battery pack, said battery pack mounted on at least one of said first and second thin disk, said array illuminating said distinctive outer surface of at least one of said first and second thin disk.

7. A set of wheel covers of claim 6 wherein said array is connected to said first and second thin disks.

8. A set of wheel covers of claim 1 wherein a spinner is rotatably mounted in said central aperture, said spinner adapted to rotate independently of said wheel cover.

9. A set of wheel covers of claim 1 wherein said plurality of protuberances each have a conical shape, each of said plurality of protruberances attached to said disks at the bases thereof.

10. A set of wheel covers for mounting on opposite sides of a spoked wheel comprising a first and a second thin disk, said first and second thin disks having a distinctive outer surface and an inner surface, said first and second thin disks each having a central aperture therethrough adapted for passage of an axle, said first and second thin disks each extending from said central aperture to an outer periphery adapted to be disposed near the rim of the spoked wheel, a plurality of fasteners attached to said inner surface of said first and second thin disks and arranged in a circular pattern about each said first and second thin disks between said central aperture and said outer periphery, said fasteners each having resilient proturberances adapted to engage a plurality of the spokes of the wheel whereby said first and second thin disks may be independently removably attached to opposite sides of the spoked wheel and wherein said first and second thin disks are discontinuous, said discontinuities extending circumferentially as a plurality of sets interrupted slots between said central aperture and said outer periphery, each said set having a different diameter.

11. A set of wheel covers of claim 10 wherein an array of electric lights is connected to at least one of said first and second thin disks, each array operatively connected to a battery pack, said battery pack mounted on at least one of said first and second thin disk, said array illuminating said distinctive outer surface of at least one of said first and second thin disk.

12. A set of wheel covers of claim 10 wherein an array of electric lights is connected to at least one of said first and second thin disks, each array operatively connected to a battery pack, said battery pack mounted on at least one of said first and second thin disk, said array illuminating said distinctive outer surface of at least one of said first and second thin disk.

13. A set of wheel covers of claim 10 wherein some of said plurality of fasteners attached to said first thin disk have first bores therethrough and some of said plurality of fasteners attached to said second thin disk have second bores therethrough, said first and second thin disks adapted to be mounted on the spoked wheel to align said first bores and said second bores, respectively, a plurality of bolts adapted to pass through said first and second bores, said plurality of bolts each having a head larger than said bores, a plurality of nuts larger than said first and second bores adapted to engage said plurality of bolts, said plurality of heads and said plurality of nuts disposed on said distinctive outer surface of said first and second thin disks and forming a part thereof.

14. A set of wheel covers of claim 10 wherein said discontinuities are shaped to generate an audible sound during rotation of a wheel.

15. A set of wheel covers of claim 10 wherein said discontinuities are shaped to generate and audible sound during rotation of a wheel.

* * * * *